United States Patent [19]

Barbee et al.

[11] 4,070,167

[45] Jan. 24, 1978

[54] SONIC APPARATUS FOR REMOVING GAS FROM PHOTOGRAPHIC EMULSION

[75] Inventors: Eugene Hartzell Barbee, East Rochester; Robert Cushman Brown, Rochester, both of N.Y.

[73] Assignee: Eastman Kodak Company, Rochester, N.Y.

[21] Appl. No.: 664,831

[22] Filed: Mar. 8, 1976

[51] Int. Cl.² ............................................. B01D 19/00
[52] U.S. Cl. ....................................... 55/192; 55/277; 118/602; 118/612
[58] Field of Search ................. 55/15, 38, 41, 57, 189, 55/190, 192, 277, 164; 118/602, 612; 427/57, 294, 345; 96/94 R

[56] References Cited

U.S. PATENT DOCUMENTS

| | | | |
|---|---|---|---|
| 2,363,247 | 11/1944 | Holder | 55/15 |
| 2,898,240 | 8/1959 | Owen | 427/57 |
| 3,044,236 | 7/1962 | Bearden et al. | 55/277 |
| 3,218,782 | 11/1965 | Litsios | 55/277 |
| 3,237,384 | 3/1966 | Rich | 55/15 |
| 3,239,998 | 3/1966 | Carter | 55/15 |
| 3,284,991 | 11/1966 | Ploegger | 55/277 |
| 3,325,976 | 6/1967 | West | 55/277 |
| 3,591,946 | 11/1968 | Loe | 55/189 |
| 3,853,500 | 12/1974 | Grassmann et al. | 55/277 |
| 3,904,392 | 9/1975 | Van Ingen et al. | 55/15 |

FOREIGN PATENT DOCUMENTS

| | | | |
|---|---|---|---|
| 460,795 | 3/1935 | United Kingdom | 55/15 |
| 651,356 | 7/1948 | United Kingdom | 55/15 |

OTHER PUBLICATIONS

Making and Coating Photographic Emulsions, Zelikma & Levi, The Focal Press, N.Y., 1964, 141, 142.

Primary Examiner—Thomas G. Wyse
Assistant Examiner—Ernest G. Therkorn
Attorney, Agent, or Firm—T. N. Dahl

[57] ABSTRACT

Bubbles are eliminated from a liquid such as a photographic emulsion by passing the emulsion through a horizontal tubular container while pulling a vacuum on the container and subjecting the emulsion to ultrasonic vibrations from an ultrasonic transducer having a horn located in a well in the bottom of the container. Emulsion is pumped out of the container and delivered through a conduit to the point of use. The delivery circuit can include a secondary gas separation chamber which also has a transducer horn therein. Provision is made for selectively recycling part or all of the emulsion back into the well. The container can be operated either partly full or completely full of liquid. Provision is also made for cleaning the internal walls of the apparatus by injecting a swirling stream of liquid into the tubular container to flow through the container and downstream portions of the system.

7 Claims, 6 Drawing Figures

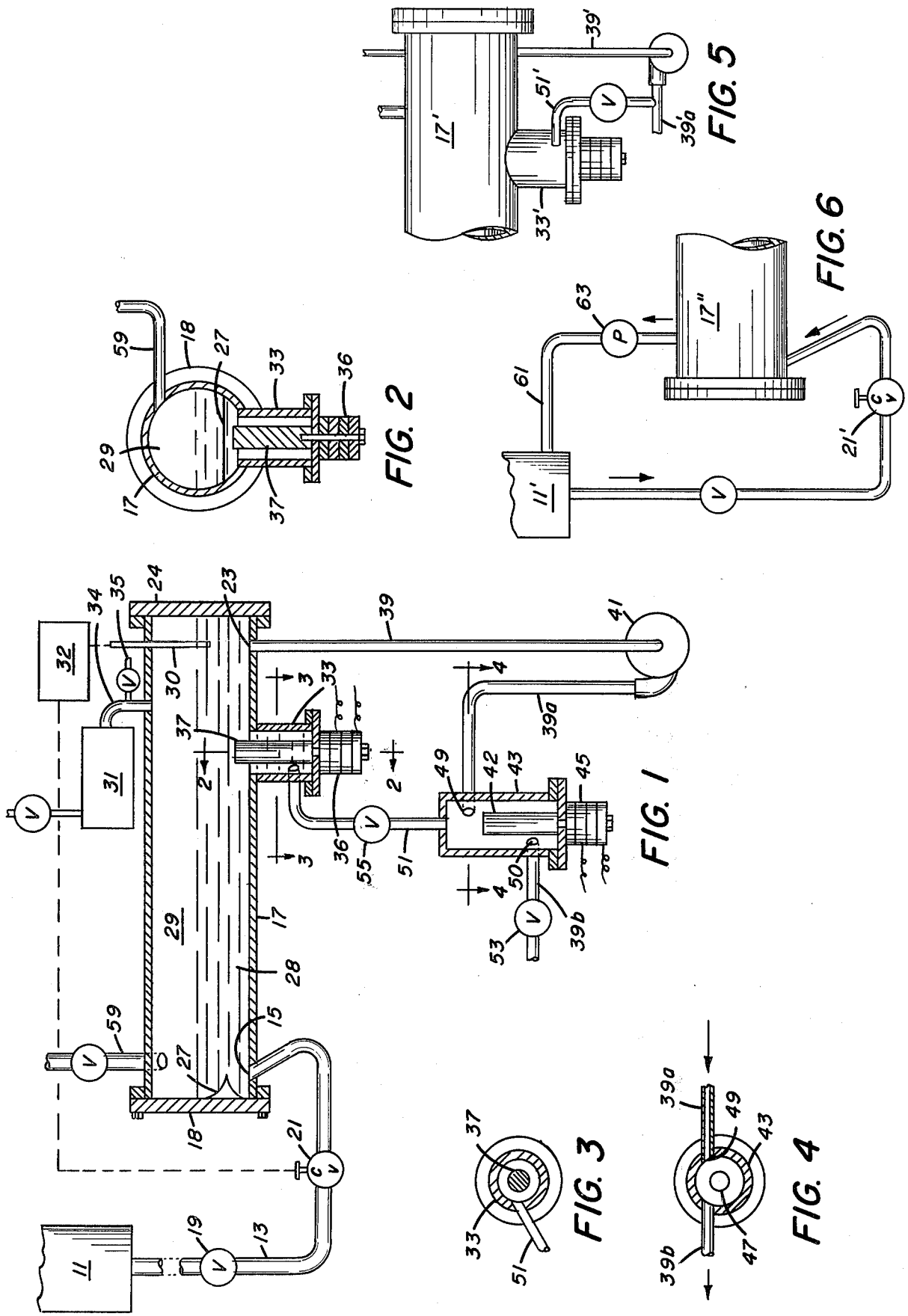

SONIC APPARATUS FOR REMOVING GAS FROM PHOTOGRAPHIC EMULSION

BACKGROUND OF THE INVENTION

1. Field of the Invention

The present invention relates to a novel apparatus and method for treating liquids containing dissolved and/or entrained gas to eliminate bubbles therefrom and to prevent bubbles from forming subsequently. More particularly the invention relates to acoustically debubbling a solution, or a dispersion such as gelatin-silver halide photographic emulsion, to eliminate bubbles therefrom and to prevent the subsequent formation of bubbles therein.

2. The Prior Art

The treatment of liquids ultrasonically for the purpose of removing or avoiding gas bubbles has been proposed in the past in such patents as U.S. Pat. Nos. 3,463,321 and 3,461,651 for photographic gelatin-silver halide emulsions, and U.S. Pat. No. 2,620,894 for viscose. While these previous proposals have been successful, they are not as efficient or as thorough as is desirable for removing detrimental gas bubbles from a photographic emulsion or other liquid.

Certain of the prior art techniques have involved causing entrained air to dissolve into the liquid by a combination of high pressure and ultrasonic energy. Such a solution tends to become saturated, or even super saturated, with gas so that a reduction in pressure at the coating station may cause some of the dissolved gas to come out of solution and thus form bubbles, lines and streaks during coating of the film or paper. Another technique has involved expelling gas bubbles from the liquid. A combination of the two has been used also.

SUMMARY OF THE INVENTION

We have found that bubble formation in liquids such as photographic emulsions or the like can be greatly reduced by subjecting the liquid to ultrasonic vibrations emanating from a vibrating acoustic horn which is immersed in the liquid, in direct physical contact therewith, while at the same time pulling a vacuum (creating a subatmospheric pressure) in a degassing chamber through which the liquid is flowing. By this technique the cavitation caused by the vibration horn causes the dissolved and entrained air or other gas to become disengaged from the liquid and to rise to the top of the chamber where it is withdrawn and discarded. The degassed and debubbled liquid flows out of the chamber and to the coating station where it can be coated on a support such as, for example, a photographic film or paper. The coating station can be operated at a higher ambient pressure than that of the degassing chamber, thus avoiding release of dissolved gas such as may occur if a coating station is at a lower pressure than the degassing chamber.

In one embodiment of our invention liquid is introduced into one end of a primary gas separation zone in a substantially horizontal, long, narrow tube or container which is closed to access of the ambient atmosphere. The liquid forms a pool and flows longitudinally to an outlet in or adjacent to the bottom of the container adjacent its opposite end, below the liquid level to reduce the possibility of entraining gas. While flowing, the liquid pool is subjected to acoustic vibrations to assist in releasing gas which rises in the pool and is withdrawn by vacuum from the top of the container.

The vacuum level should be maintained below that at which the liquid boils to avoid foaming. Stated in another way, the absolute pressure should be maintained above that at which the liquid boils.

Advantageously, the vibrations are produced by an ultrasonic transducer having a horn which is located within a well in the bottom of the container, and which protrudes into the pool of liquid.

Generally the liquid is fed to our apparatus by gravity from a source which is located above the level of the container. Flow from the source is regulated by a variable flow control valve which is controlled by a level sensor associated with the container for increasing or decreasing flow as required to maintain a stable level. Discharge of the degassed liquid from the container is effected by pumping it out of the vacuum in the container.

Our apparatus can be operated without recycle, or with recycle by pumping liquid from the discharge conduit back into the container for retreatment. Full recycle is advantages for start-up to establish stable conditions before the liquid is fed to its point of use. Partial recycle helps to remove any gas which may have flashed out of solution in the discharge conduit.

Gas removal can be further improved by including a pressure chamber as part of the discharge conduit as a secondary gas separation zone, and pumping the liquid into and out of the pressure chamber while subjecting the liquid to acoustic vibration as it passes through the chamber. Recycle from the top of the pressure chamber is especially advantageous because it assures that any released gas which tends to accumulate in the top of the pressure chamber will be carried back to the primary zone in the container for removal from the system.

We also provide for periodically cleaning out the degassing system by passing a cleaning liquid such as water (with or without dissolved adjuvants such as detergents), or other cleaning agents therethrough with a swirling motion.

THE DRAWINGS

FIG. 1 is a vertical sectional view, partly in side elevation, showing one embodiment of our ultrasonic degassing apparatus;

FIG. 2 is a vertical sectional view taken along line 2—2 in FIG. 1;

FIG. 3 is a cross sectional view taken along line 3—3 in FIG. 1;

FIG. 4 is a cross sectional view taken along line 4—4 in FIG. 1;

FIG. 5 is a side elevational view of a part of a second embodiment; and

FIG. 6 is a side elevational view of a part of a third embodiment.

THE PREFERRED EMBODIMENTS

Referring to FIGS. 1, 2, 3, and 4 to illustrate a typical apparatus and procedure, a stream of aqueous gelatin-silver halide dispersion containing both dissolved gas and entrained gas bubbles flows by gravity from a source 11 through a conduit 13 to an inlet 15 in the bottom of a tube or container 17 near one end 18. Flow is controlled by a shut off valve 19 and a variable flow valve 21 in conduit 13. Valve 21 can be a pinch valve on a resilient tube, a needle valve, a plug valve, a gate valve, or the like.

Container 17 is a cylindrical tube having an approximately horizontal longitudinal axis. It is closed at its opposite ends and has an outlet 23 in its bottom near opposite end 24.

Inlet 15 is inclined toward end 18 and injects liquid against a baffle 27 which is so constructed and arranged as to direct liquid impinging thereon in a direction lengthwise of the container toward outlet 23. A pool 28 of flowing liquid accumulates to a depth less than the full diameter, for example, a depth of about 1/2 the diameter, so as to leave a space 29 above the liquid level for gas accumulation. Liquid level is controlled automatically by valve 21 whose opening is controlled in response to signals from a capacitance or other type of probe 30 acting through a control system 32, for example, a Drexelbrooke RF system comprising level transmitter and integral proportional controller.

The inside of the container is maintained at a subatmospheric pressure (vacuum) by a vacuum pump 31 which withdraws gas from space 29 through conduit 34. Efficiency of gas removal is high due to the large area of pool surface from which gas can escape (which also assures a shallow foam depth), coupled with the subatmospheric pressure for gas removal. The vacuum is preset and maintained below the boiling point by an adjustable air bleed 35 in the vacuum line 34.

Container 17 has a well 33 in its bottom, and an ultrasonic transducer 36 extends from outside the container into the well. Transducer 36 is secured to or integral with the bottom periphery of the well and has a cylindrical horn 37 extending into the well in spaced relation to the side wall of the well and projecting from the well a short distance into the main body of the container below the liquid level. Horn 37 imparts acoustic energy to the liquid to cause gas bubbles to agglomerate and rise up through the liquid into space 29. Horn 37 advantageously is 1¾ wavelength long and protrudes about ¼ to ½ inch out of the well into the main body of the container, the free end of the horn thus being at a vibrational antinode for maximum energy transmission to the liquid. The exact length, of course, can be determined for each transducer design and material by well known techniques, as by observing the pattern developed in a layer of powder and then trimming material off the end of the horn as necessary.

Horn 37 advantageously is located closer to outlet 23 than to inlet 15, for maximum acoustic energy efficiency. For example, it is located at a position about ⅓ the length of the container from end 24. If it is located too near inlet end 18, the acoustic energy is quickly dissipated in the gas bubbles of the incoming liquid. If it is too near outlet 23, ultrasonic cavitation bubbles may flow out the outlet instead of rising to the top of the pool.

Degassed liquid, still containing some entrained and dissolved gas, is pumped out of outlet 23 and flows via a delivery conduit 39 through a centrifugal pump 41 to the point of use. Pump 41 should be one which operates without pulsations to assure that the liquid ultimately coats film or paper with a smooth, regular non-streaked coating. An example of such a pump is a magnetically coupled centrifugal pump of the type shown in U.S. Pat. No. 3,411,450.

In the modification of FIG. 1 conduit 39 includes a section 39a, a vertical cylindrical pressure chamber 43 having a second transducer 45 mounted to its lower end and having a second cylindrical horn 47 protruding into the pressure chamber. Liquid enters through an off center approximately tangential inlet 49, fills the chamber, swirls around horn 47, and is discharged into conduit section 39b through an outlet 50 near the bottom of the pressure chamber.

In pressure chamber 43 some of the entrained gas is forced into solution, but there can be also an accumulation of gas in the top of the chamber which must be removed to avoid overloading and consequent passage of bubbles to the coating station. Such gas along with liquid is recycled from the top of pressure chamber 43 through a valve-controlled recycle conduit 51 back into primary container 17 for retreatment. Advantageously the recycle is through an approximately tangential inlet in the side wall of well 33 so that the recycled liquid swirls around horn 37. Such recycle improves the capacity of the apparatus by removing gas from chamber 43, and by causing additional gas to flash out of solution in the recycle conduit 51 due to reduced pressure. Tangential return to well 33 also inhibits sedimentation or separation of suspensions which might otherwise occur in well 33.

The provision for recycle also is especially advantageous because it allows flow into container 17 and out of pressure chamber 43 to be stopped while continuing internal operation, thus reducing operational delays by allowing the apparatus to be held ready for resumed operation when desired.

Recycle also is advantageous because it permits a steady operating condition to be established upon filling and starting the system before delivery of degassed liquid to its point of use. Without such recycle there is apt to be excessive foaming, and primimg of the pump 41 is difficult. To avoid the foregoing difficulties, it is necessary only to close valve 53 in conduit section 39b and to adjust valve 55 in conduit 51 for the desired recycle flow rate.

Periodically it is desirable to clean the inside of the apparatus. A valve controlled water supply conduit 59 is connected into container 17 near inlet end 18, and is approximately tangential so as to direct flushing water with a swirling motion. The water also swirls around inside pressure chamber 43 and well 33. These three elements are all cylindrical in shape so as to permit the water to exert maximum effect.

Referring to FIG. 5, thereis shown a system without a pressure chamber as part of the delivery conduit. However, the aforementioned advantages of recycle are secured by taking a recycle conduit 51' directly off of conduit 39' and delivering liquid and associated to a well 33' of container 17'.

Referring to FIG. 6, there is shown a system wherein the container 17" is operated completely full of liquid, with liquid and separated gas bubbles being recycled through a conduit 61 and vacuum pump 63 to the source 11'. The rest of the apparatus is essentially as described in connection with FIGS. 1 and 5, except that a separate vacuum pump such as 31 is not needed, and valve 21' need not be controlled in response to liquid level, but is set for a steady flow greater than the expected rate of withdrawal from the system through the outlet corresponding to outlet 23 of FIG. 1.

The apparatus and method described above have numerous important attributes for reducing the dissolved gas content (desaturating) and eliminating entrained gas bubbles, among which are 1. The horizontal tube which provides the following advantages:
   a. A shallow, long horizontal flow path for controlled air/liquid separation at high flow rates. Desirably the length is between 4 and 15 times the width, for example 6 inches in diameter and 3 feet long.

b. A relatively large surface area associated with the shallow liquid which helps control foam. The foam breaking which naturally occurs at the surface is spread out over a large area preventing excessive foam depth. The relatively large surface area also improves degassing capability by increasing the nucleation of bubbles and gaseous diffusion from the liquid to the subatmospheric pressure air above the liquid.

c. Ultrasonic energy application at the bottom of the liquid near the exit of the horizontal tube so that the tip of the ultrasonic horn is not surrounded by bubble laden solution which absorbs the ultrasonic energy. Positioning the transducer in the well extends the life of the tube by reducing ultrasonic corrosion.

d. Outlet in the bottom of tube which reduces the probability of entrained air at the exit. Also sufficient horizontal distance is provided between the tip of the ultrasonic horn and the outlet to prevent ultrasonic cavitation bubbles from flowing out the outlet.

e. Inlet below the liquid level which prevents excessive foaming and frothing due to uncontrolled bubble formation and turbulence.

2. The recycle which gives the following advantages:

a. It improves the capacity of the device by allowing the pressure chamber 43 to provide a secondary separation process. Bubbles are known to collect in the top of chamber 43 and the recycle provides a path for these bubbles to be returned to the primary separation chamber (horizontal tube 17).

b. It improves the degassing capacity of the device due to gas flashing at valve 55 in the recycle line. Reintroduction of solution into the tube 17 allows separation of this gas from solution.

c. It allows flow in and out of the device to be stopped while continuing internal operation by recirculating fluid. This allows the device to be held in a "ready" mode without stagnation, thus reducing operational delays.

d. It facilitates priming of the pump and provides bubble-free degassed liquid ready at the exit, since the operation of filling and starting the system without excessive foaming requires liquid to be introduced into the previously evacuated device.

3. The magnetically coupled centrifugal pump 41 provides a means for pumping out of a vacuum and pressurizing a delivery system smoothly and without the risk of air entrainment through a rotating shaft seal.

4. The tube 17 is operated at a vacuum less than that at which boiling occurs, thus avoiding solvent loss and solution temperature reduction. This also allows a low power, simple vacuum pumping system. For samples of gelatin solution at 25 inches of mercury vacuum the dissolved air is reduced from 100% to 40–70% of saturation, depending on flow rate. Also, a negligible amount of water is lost.

A few general observations should assist those skilled in this art. The acoustic horns can be constructed of any suitable metal such as titanium, stainless steel, Stellite alloy, aluminum and the like, all well known. Also, the construction and operation of acoustic transducers are described in many patents and publications (for example, U.S. Pat. Nos. 3,022,814 and 3,328,610, and Product Licensing Index, Vol. 86, June 1971, Item 8606). Horn vibration in the ultrasonic range is preferred, generally considered to be 20 KHz or higher, but debubbling can also be accomplished at lower frequencies if noise is not considered objectionable.

Horn length can be greater or less than described above. The length between antinodes will vary for different metals and different frequencies. Location of such antinodes can readily be established on any given horn by techniques well known in the ultrasonic art. For example, the effect of vibrations on powder can be observed, or the horn can be probed with a piezoelectric phonograph needle pickup.

The invention has been described in detail with particular reference to preferred embodiments thereof, but it will be understood that variations and modifications can be effected within the spirit and scope of the invention.

We claim:

1. Apparatus for removing gas from a liquid comprising, in combination, a closed container having inlet and outlet for liquid flow in and out of said container;
   a well in the bottom of said container;
   an acoustic transducer having a horn located in said well in spaced relation to a wall thereof and having an end projecting into said container;
   first conduit means leading from said outlet;
   pump means in said first conduit means;
   means for creating a vacuum in said container for withdrawing released gas therefrom;
   second conduit means connecting said first conduit means to said well for selectively recycling to said container, through said well, liquid leaving said outlet; and
   valve means for controlling the flow of liquid in said second conduit means.

2. Apparatus in accordance with claim 1 wherein said first conduit means includes a pressure chamber downstream of said pump, and wherein said second second conduit means leads from said pressure chamber to said well; said apparatus also comprising a second acoustic transducer having a second horn within said pressure chamber 3. Apparatus in accordance with claim 2 wherein said pressure chamber has an inlet adjacent the top positioned for introducing liquid with a swirling motion, and has an outlet adjacent the bottom below the end of said second horn.

4. Apparatus in accordance with claim 3 wherein said second conduit means is connected to said well in position for introducing recycled liquid with a swirling motion around said first horn.

5. Apparatus in accordance with claim 1, wherein said container is long and narrow and has a longitudinal axis arranged about horizontally; and wherein said outlet is located adjacent the bottom thereof.

6. Apparatus in accordance with claim 5 wherein said container has a baffle adjacent said inlet so constructed and arranged as to direct liquid impinging thereon in a direction lengthwise of said container toward said outlet; and wherein said inlet is directed toward said baffle for directing inflowing liquid against said baffle.

7. Apparatus in accordance with claim 1 wherein said container and said well are both generally cylindrical; said apparatus also comprising means for introducing a swirling stream of cleaning liquid into said container near the inlet end thereof to pass through said container and said well for cleaning said apparatus.

* * * * *

UNITED STATES PATENT OFFICE
CERTIFICATE OF CORRECTION

PATENT NO. : 4,070,167
DATED : January 24, 1978
INVENTOR(S) : Eugene H. Barbee and Robert C. Brown It is certified that error appears in the above-identified patent and that said Letters Patent are hereby corrected as shown below:

In the Abstract, line 9, change "circuit" to --conduit--.

Column 1, line 46, change "vibration" to --vibrating--.

Column 2, line 21, change "advantages" to --advantageous--;

line 29, change "vibration" to --vibrations--.

Column 4, line 48, after "associated" insert --gas--.

Signed and Sealed this

Fifteenth Day of August 1978

[SEAL]

Attest:

RUTH C. MASON
Attesting Officer

DONALD W. BANNER
Commissioner of Patents and Trademarks